United States Patent [19]

Niino

[11] Patent Number: 5,143,982

[45] Date of Patent: Sep. 1, 1992

[54] POLYOXYMETHYLENE RESIN COMPOSITION

[75] Inventor: Masahiko Niino, Kurashiki, Japan

[73] Assignee: Asahi Kasei Kogyo Kabushiki Kaisha, Osaka, Japan

[21] Appl. No.: 690,343

[22] Filed: Apr. 24, 1991

[51] Int. Cl.$^5$ .................. C08L 61/02; C08L 67/02; C08L 67/03

[52] U.S. Cl. .................. 525/400; 525/398; 525/418

[58] Field of Search .................. 525/400, 418, 398

[56] References Cited

U.S. PATENT DOCUMENTS

| | | | |
|---|---|---|---|
| 3,595,937 | 7/1971 | Weissermel et al. | 525/400 |
| 3,696,171 | 10/1972 | Braunstein | 525/400 |
| 3,697,624 | 10/1972 | Braustein | 525/400 |

FOREIGN PATENT DOCUMENTS

| | | | |
|---|---|---|---|
| 729727 | 3/1966 | Canada | 525/400 |
| 0420619 | 3/1991 | European Pat. Off. | |
| 2449343 | 4/1976 | Fed. Rep. of Germany | 525/400 |
| 96-4658 | 2/1971 | Japan | 525/400 |
| 57-10640 | 1/1982 | Japan | 525/400 |
| 480735 | 11/1975 | U.S.S.R. | 525/400 |

OTHER PUBLICATIONS

Chem. Abs., 81, No. 18 (1974).

Primary Examiner—James J. Seidleck
Assistant Examiner—W. R. H. Clark
Attorney, Agent, or Firm—Birch, Stewart, Kolasch & Birch

[57] ABSTRACT

A polyoxymethylene resin composition excellent in decorative property and hot-stampability comprising 50-97% by weight of polyoxymethylene resin and 3-50% by weight of polyester random copolymer comprising a diol residue A and a dicarboxylic acid residue B, said diol residue A being represented by the formula $+O-R-O+$, wherein R is an alkyl group of 2-12 carbon atoms, and said dicarboxylic acid residue B being represented by at least one of formulae (1), (2) and (3),

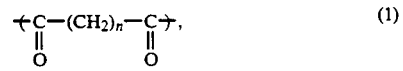 (1)

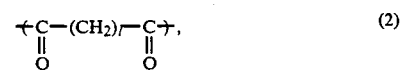

(2)

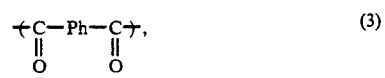

(3)

wherein n is an integer of 2-6, l is an integer of 7-24, and Ph is an aromatic hydrocarbon residue, the proportion of (1) to the sum of (1), (2) and (3) being 5-100% by mol, provided that when said proportion is 100% by mol, (1) consist of at least two different types of (1).

10 Claims, No Drawings

POLYOXYMETHYLENE RESIN COMPOSITION

BACKGROUND OF THE INVENTION

1. Field of the Invention

The present invention relates to a polyoxymethylene resin composition excellent in decorative property. More particularly, the present invention relates to a polyoxymethylene resin composition excellent in coatability and hot-stampability.

2. Related Art

Polyoxymethylene resin is an engineering resin having well-balanced mechanical properties and excellent lubricity and is widely used for various mechanism parts, office automation instruments, and so forth.

However, polyoxymethylene resin has a serious defect of being very poor in decorative properties including coatability and hot-stampability, because it is a highly crystalline resin.

Various methods have been proposed to ameliorate the decorative properties of the polyoxymethylene resin. For example, Japanese Patent Application Kokoku (Post-Exam. Publn.) No. S46-4658 discloses a method comprising blending into a polyacetal resin, a linear polyester synthetic resin had been formed by using an aromatic dicarboxylic acid as the dicarboxylic acid component. However, this disclosure neither teaches the specific polyester copolymer according to the present invention nor the excellent decorative property obtainable by the use of this copolymer. Japanese Patent Application Kokoku (Post-Exam. Publn). No. S60-19,331 discloses to add to a polyacetal resin, a copolyester formed from specific monomers different from those used in the present invention, to improve the impact strength thereof. U.S. Pat. No. 4,117,033 and Japanese Patent Application Kokai (Laid-open) Nos. H2-4,849 and S61-148,221 disclose to add to a polyacetal resin, a polyester whose monomer composition is different from those used in the present invention, to improve fluidity, antistatic property and impact strength thereof. Further, Japanese Patent Application Kokai (Laid-open) No. H2-166,150 discloses to add to a polyacetal resin, a polyester-polyester block copolymer, to improve the impact resistance thereof. However, the block copolymer is essentially structurally different from the random copolymer according to the present invention. Moreover, even when the various polyesters described in the above-mentioned patent specifications are added to a polyoxymethylene resin, the coatability and the hot-stampability of the polyoxymethylene resin, are still not improved effectively.

SUMMARY OF THE INVENTION

According to the present invention, there is provided a polyoxyethylene resin composition having excellent coatability and hot-stampability, which previously had not been attainable for polyoxymethylene resins. This composition was provided by the addition of a specific polyester random copolymer to the polyoxymethylene resin. In particular, the polyoxymethylene resin composition according to the present invention comprises 50-97% by weight of polyoxymethylene resin and 3-50% by weight of a polyester random copolymer comprising a diol residue A and a dicarboxylic acid residue B, said diol residue A being represented by the formula $+O-R-O+$, wherein R is an alkyl group of 2-12 carbon atoms, and said dicarboxylic acid residue B being represented by at least one of the following formulae (1), (2) and (3),

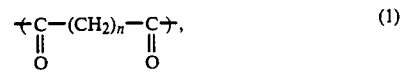

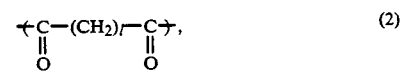

wherein n is an integer of 2-6, l is an integer of 7-24, and Ph is an aromatic hydrocarbon residue, the proportion of the residue (1) to the sum of the residues (1), (2) and (3) being 5-100% by mol, provided that when said proportion is 100% by mol, the residue (1) consist of at least 2 different types of residue (1). In the formulae (1) and (2), the $+CH_2+_n$ and $+CH_2+$ groups can each be replaced by an alkenylene group.

DETAILED DESCRIPTION OF PREFERRED EMBODIMENTS

The polyoxymethylene resin composition according to the present invention is a composition comprising 59-97% by weight of polyoxymethylene resin and 3-50% by weight of a polyester random copolymer comprising an alcohol component and an acid component, wherein the alcohol component is at least one member selected from an aliphatic diol having 2-12 carbon atoms, and wherein 5-100% by mol of the acid component consist of at least one member selected from aliphatic dicarboxylic acids having 4-8 carbon atoms (providing that when 100% by mol of the acid component consist of aliphatic dicarboxylic acids having 4-8 carbon atoms, the acid component consists of at least different types two of such member), and 0-95% by mol of the acid components consist of at least one member selected from an aromatic dicarboxylic acid, an aliphatic dicarboxylic acid having 9 or more carbon atoms or a mixture thereof.

The polyoxymethylene resins of the present invention are comprised of oxymethylene homopolymer consisting essentially of oxymethylene units, prepared from a formaldehyde monomer or a cyclic oligomer thereof, such as the trimer (i.e., trioxane) or the tetramer (i.e., tetraoxane), as the raw material and an oxymethylene copolymer containing 0.1-20% by weight of oxyalkylene units of 2-8 carbon atoms prepared from the above-mentioned raw material or a mixture thereof, and a cyclic ether such as ethylene oxide, propylene oxide, epichlorohydrin, 1,3-dioxolan, formal of glycol, formal of diglycol, etc., or a mixture thereof. The polyoxymethylene resin of the present invention further includes oxymethylene copolymer having a branched molecular chain.

The preferred polyester random copolymer of the present invention comprises a diol residue A alcohol component, wherein the diol residue A is at least one member selected from aliphatic diols having 2-12 carbon atoms; and a dicarboxylic acid residue B acid component, wherein 5-100% by mol of the acid component of at least one member selected from aliphatic dicarboxylic acids having 4-8 carbon atoms represented by the formula

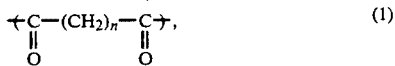

wherein n is an integer of 2-6, (providing that when 100% by mol of said acid components consist of aliphatic dicarboxylic acids having 4-8 carbon atoms, the acid components consist of at least two different types of such member); and 0-95% by mol of said acid components consist of at least one member selected from an aromatic dicarboxylic acid represented by the formula

wherein Ph is an aromatic hydrocarbon residue, aliphatic dicarboxylic acids having 9 or more carbon atoms represented by the formula

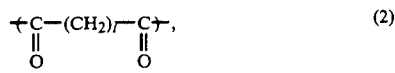

wherein l is an integer of 7-24 or a mixture thereof. The contents of the dicarboxylic acid residues B (1), (2) and (3) should be correlated with one another such that the proportion of (1) to the sum of (1), (2) and (3) is 5-100% by mol, providing that when said proportion is 100% by mol, (1) must consist of at least two different types of (1).

As specific examples of the alcohol component, there may be mentioned ethylene glycol, propanediol-(1,2), propanediol-(1,3), 2,2'-dimethylpropanediol-(1,3), butanediol-(1,4), butanediol-(1,3), pentanediol-(1,5), hexanediol-(1,6), heptanediol-(1,7), octanediol-(1,8), nonanediol-(1,9), decanediol-(1,10), dodecanediol-(1,12), pinacol, cyclopentane-1,2-diol, cyclohexane-1,2-diol, cyclohexane-1,4-diol, etc. Particularly preferred among these are ethylene glycol, propanediols, and butanediols.

Specific examples of the acid component include aliphatic saturated dicarboxylic acids such as oxalic acid, malonic acid, succinic acid, glutaric acid, adipic acid, pimelic acid, suberic acid, azelaic acid, sebacic acid, etc.; aliphatic unsaturated dicarboxylic acids such as maleic acid, fumaric acid, etc.; and aromatic dicarboxylic acids such as phthalic acid, isophthalic acid, terephthalic acid, naphthalene-1,5-dicarboxylic acid, naphthalene-2,6-dicarboxylic acid, naphthalene-2,7-dicarboxylic acid, 4,4-dicarboxydiphenyl, bis(4-carboxyphenyl)methane, bis(4-carboxyphenyl)ethane, bis(4-carboxyphenyl) ether, 1,2-bis(4-carboxyphenyl)ethane, anthracene-5,10-dicarboxylic acid, anthracene-1,4-dicarboxylic acid, anthracene-1,5-dicarboxylic acid, anthracene-2,6-dicarboxylic acid, etc. Particularly preferred among these are succinic acid, glutaric acid, adipic acid, pimelic acid, terephthalic acid, and isophthalic acid.

The polyester random copolymer of the present invention may be prepared by known methods.

The polyester random copolymer of the present invention is preferably a polyester copolymer which has in its molecule, no segment (i.e., segment block) consisting of the repetition of an ester formed from a single dicarboxylic acid and a single diol and having a number average molecular weight exceeding 2,000. More preferably, it is a polyester copolymer which has in its molecule, no segment consisting of the repetition of an ester formed from a single dicarboxylic acid and a single diol and having a number average molecular weight exceeding 1,000.

Preferred methods for preparing the random copolymer include, for example, the method disclosed in Japanese Patent Application Kokoku (Post-Exam. Publn.) No. S62-41,551, which comprises first reacting a dimethyl dicarboxylate with an excess of a diol to effect complete demethanolation and then adding a dicarboxylic acid to effect dehydration, and the method disclosed in Japanese Patent Application Kokoku (Post-Exam. Publn.) No. S60-17,359, which provides a random copolymer by one stage dehydration from a dicarboxylic acid and a diol (the method being referred to as the direct method).

The polyester random copolymer of the present invention prepared by the above-mentioned methods is essentially different from polyester segmentalized copolymers prepared by first reacting a single dimethyl dicarboxylate with a single diol in a molar ratio of 1:1 to effect demethanolation and to polymerize into a prepolymer having a number average molecular weight of 2,000 or more, then adding a dicarboxylic acid and a diol, respectively, of a different type to the prepolymer, and heating the mixture to effect a reaction.

The polyester random copolymer of the present invention, preferably has as small a content as possible of the titanium component of the residue of the catalyst used in preparation. This is because titanium compounds severely impair the thermal stability of polyoxymethylene resins in processing. The content in terms of titanium is preferably 0.05% by weight or less, more preferably 0.03% by weight or less.

In the polyester random copolymer of the present invention, 5% by mol or more of the acid components, preferably 20% by mol or more thereof, consist of an aliphatic dicarboxylic acid having 4-8 carbon atoms. More preferably, 30% by mol or more thereof consist of said dicarboxylic acid. The upper limit of the content is preferably 80% by mol. The abovementioned content of the aliphatic dicarboxylic acid having 4-8 carbon atoms defines to a certain extent, the glass transition temperature of the polyester random copolymer of the present invention, which is approximately in the range of 0° to −50° C. However, not all polyesters which have a glass transition temperature in the above range are satisfactory, but the composition of monomers constituting the polyester is conceivably an important factor.

The polyester random copolymer of the present invention has a melting point of preferably 80°-180° C., more preferably 90°-160° C.

As to the aromatic dicarboxylic acid used in the present polyester random copolymer, it is preferable to use isophthalic acid in a proportion of 10% by mol or more, and more preferably 15% by mol or more of the acid components.

The amount of the dicarboxylic acid forming the residue shown by formula (2) is the balance.

The polyester random copolymer of the present invention has a number average molecular weight of preferably 2,000-50,000, more preferably 5,000-30,000.

The polyester random copolymer of the present invention may be added in a proportion of 3-50% by weight relative to the polyoxymethylene resin. When the proportion is less than 3% by weight virtually no improvement is obtained in coatability and hot-stampability. When the proportion exceeds 50% by weight, no further improvement is obtained in said properties, while the mechanical strength is greatly lowered. The proportion is more preferably 10-30% by weight.

The polyester random copolymer of the present invention has an acid value of desirably 100 meq/kg or less, preferably 50 meq/kg or less.

The acid value referred to herein means the milliequivalents of KOH consumed when a solution of 1 kg of polyester random copolymer in benzyl alcohol is titrated with an aqueous 1/10 N KOH solution using phenolphthalein as an indicator.

A high acid value signifies that a large number of carboxyl acid groups exist at the molecular terminals.

The number of the carboxyl acid groups is preferably smaller, because the group causes the lowering of the thermal decomposition initiation temperature of the present resin composition.

In the composition of the present invention, there may be used, if necessary and desired, a coupling agent for polyoxymethylene resin and polyester random copolymer, and a catalyst therefor.

A preferred coupling agent is an isocyanate compound. A preferred catalyst is a tertiary amine.

The isocyanate compound used in the present invention refers to a compound which has at least one isocyanate or isothiocyanate group in the molecule. As specific examples, there may be mentioned (1) monoisocyanate compounds such as hexyl isocyanate, octyl isocyanate, octadecyl isocyanate, cyclohexyl isocyanate, phenyl isocyanate, tolyl isocyanate, benzyl isocyanate, naphthyl isocyanate, etc, (2) diisocyanate compounds such as hexamethylene diisocyanate, cyclohexylene diisocyanate, dicyclohexylmethane diisocyanate, isophorone diisocyanate, phenylene diisocyanate, toluene diisocyanate, xylene diisocyanate, naphthalene diisocyanate, diphenylmethane diisocyanate, dimethyldiphenylmethane diisocyanate, dimethyldiphenylene diisocyanate, etc., (3) triisocyanate compounds such as triphenylmethane triisocyanate, benzene triisocyanate, etc.; or isothiocyanate compounds corresponding to the isocyanate compounds listed above; oligomers, such as dimers, trimers, etc., of the above-mentioned isocyanate compounds; hydrogenated products of the above-mentioned aromatic isocyanate compounds; substitution products of the above-mentioned isocyanate compounds with alkyl groups, aryl groups, or substituents containing a halogen atom; isomers of the above-mentioned isocyanate compounds; or reaction products (having residual isocyanate group) of the above-mentioned isocyanate compounds with a compound of a molecular weight of 3,000 or less having an alcohol or carboxylic acid group. These isocyanate compounds may also be used in a combination of two or more thereof.

A preferred isocyanate compound is a trimer of hexamethylene diisocyanate having an isocyanurate ring or the derivative thereof.

The amount of the isocyanate compound used in the present invention to be incorporated, is 0.5-5.0% by weight. When the amount is less than 0.5% by weight the effect of the addition of the isocyanate compound as a coupling agent is not exhibited, whereas when it exceeds 5.0% by weight the processability of the polyoxymethylene resin is greatly deteriorated. The most preferable range of the amount, in which the effect of the present invention is exhibited to the full extent, is 1.0-3.0% by weight. Further, trifunctional isocyanate compounds are more preferably used.

Next, a description is given below of the tertiary amine used as the catalyst. The tertiary amines referred to in the present invention are tertiary amines represented by the formula

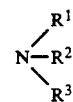

wherein $R^1$, $R^2$ and $R^3$ are each independently a substituent selected from alkyl or substituted alkyl groups of 1-22 carbon atoms and aryl or substituted aryl groups of 1-22 carbon atoms. Specific examples thereof include butyldimethylamine, amyldimethylamine, hexyldimethylamine, heptyldimethylamine, octyldimethylamine, nonyldimethylamine, decyldimethylamine, undecyldimethylamine, dodecyldimethylamine, tridecyldimethylamine, tetradecyldimethylamine, pentadecyldimethylamine, cetyldimethylamine, stearyldimethylamine, behenyldimethylamine, dilaurylmonomethylamine, trioctylamine, trilaurylamine, cyclohexyldimethylamine, dimethylaniline, diethylaniline, dimethylbenzylamine, triphenylamine, diphenylmethylamine, dimethylnaphthylamine, N-laurylmorpholine, triethylenediamine, N,N,N',N'-tetramethylethylenediamine, an addition product of two mols of ethylene oxide to stearylamine, etc., but the tertiary amines of the present invention are not limited thereto. Tertiary amines having 10-40 carbon atoms are preferred, those having 18-30 carbon atoms being more preferred, from the viewpoint of the coupling effect of isocyanates. The amount of the tertiary amine to be incorporated is 5% by weight or less, because a satisfactory coupling effect cannot be obtained when it exceeds 5% by weight. A more preferable amount is 0.05-3% by weight.

The polyoxymethylene resin composition for decoration of the present invention may be prepared by melt-kneading the mixture of the necessary constituents at a temperature higher than the melting point of the polyoxymethylene resin using known equipment conventionally used in kneading resin melt, such as a kneader, roll mill, extruder etc. Extruders are most suitable as the melt-kneading equipment from the viewpoint of interruption of oxygen, work environment, etc. Various types of extruders are known, including extruders of single screw, twin screw, vent type, ventless type, etc., any of which can be used for preparing the composition of the present invention. The kneading temperature should not be lower than the melting point of the polyoxymethylene, a temperature in the range of 180°-240° C. being sufficient to enable extrusion. As to the time necessary for kneading, approximately the same length of time as that required for extruding the polyoxymethylene resin singly gives a satisfactory result.

Though the kneading conditions for preparing the present composition were described above, the methods and the conditions of kneading are not limited thereto, and any desired methods and conditions may be used, particularly those selected from known methods and conditions used for preparing polyoxymethylene resin compositions.

The present composition may be incorporated with antioxidants and/or light stabilizers and/or inorganic fillers and/or pigments and/or lubricants and other additives, conventionally added to plastics. Also, it may further be incorporated with polyamide, melamine, melamine derivatives, dicyandiamide, fatty acid calcium salts, etc., additives which are usually added to polyoxymethylene resin.

As to the antioxidant, in particular, those having the 3-methyl-4-hydroxy-5-t-butyl group are preferred, because the simultaneous addition of said antioxidants produces an outstanding improvement of coloration retention.

Preferred antioxidants are 3,9-bis[2-[3-(t-butyl-4-hydroxy-5-methylphenyl)propionyloxy]-1,1-dimethylethyl-2,4,8,10-tetraoxaspiro[5,5]-undecane, triethylene glycol-bis[3-(3-t-butyl-5-methyl-4-hydroxyphenyl)-propionate], and 1,6-hexanediol-bis[3-(3-t-butyl-5-methyl-4-hydroxyphenyl)propionate].

The amount of these antioxidants to be added relative to the whole composition, is preferably 0.3-2% by weight, more preferably 0.8-1.5% by weight, from the viewpoint of coloration retention.

The polyoxymethylene resin used in the present invention may be conventionally used polyoxymethylene homopolymers, copolymers, branched polymers, block copolymers or blends thereof.

The composition of the present invention may be used, by virtue of its excellent characteristic properties, for the integrally molded key top and stem of key boards, outer door handles of automobiles, counter wheels, housings, levers, shutter materials of floppy disks, fasteners, low noise gears, etc.

The composition of the present invention has a high fluidity, particularly a high shear rate dependency of the melt viscosity, so that it is suitable for extrusion and blow molding.

By virtue of the above characteristic, the present composition, singly or as a composite with other molding materials, may be used for gasoline tank bodies and gasoline tank floats or extruded bars and various machined products using the bar.

In particular, multi-layer blow moldings, for example gasoline tanks formed by multi-layer blow molding, making the most of the fluidity and surface characteristics of the composition of the present invention are one of the most appropriate applications of the present composition.

The present invention has succeeded in improving to a surprising extent, the poor coatability and hot-stampability inherent in polyoxymethylene resin by adding to the polyoxymethylene resin, a polyester random copolymer of a specific monomer composition, and thus succeeded in providing a polyoxymethylene resin composition, which has an excellent decorative property that was never obtainable by the addition of polyester copolymers known to the art.

The excellent decorative property represents an effect never before obtained by polyetherester and polyester segmentalized copolymer.

The present invention will be described further in detail below with reference to Examples and Comparative Examples, but the invention is in no way limited thereto.

The cross-cut adhesion test, one of the test items described in Examples, was made in the following manner.

CROSS-CUT ADHESION TEST

This is a test for the evaluation of the "decorative property" referred to in the present invention and is a test of adhesive strength between the film of a coating material or of an adhesive and a specimen.

On a coating material film or other film adhered onto a specimen (these films being hereinafter abbreviated as adhered film), are drawn with a knife longitudinal and transverse 11 each parallel lines with an interval of 1 mm at right angles, to form 100 squares in 1 $cm^2$. A cellophane tape is adhered onto the squares thus formed, then the tape is peeled off, and the number of squares where the adhered film has been peeled off is determined. The smaller the number of squares where peeling took place, the higher the adhesive strength of the adhered film.

EXAMPLES 1-12 AND COMPARATIVE EXAMPLES 1-8

Polyoxymethylene homopolymer powder whose both molecular terminals had been acetylated was prepared by a known method disclosed in U.S. Pat. No. 2,998,409. The polymer had an intrinsic viscosity of 1.2. (The intrinsic viscosity was determined with a 0.1% by weight solution of the polymer in p-chlorophenol containing 2% by weight of α-pinene dissolved therein.) It showed a melt index of 9.0 g/10 min as determined according to ASTM D1238-57T (condition E). The polyoxymethylene homopolymer powder was dried at 80° C. for 3 hours and blended with the polyester random copolymer shown in Tables 1 and 2 prepared by the direct method described in Japanese Patent Application Kokoku (Post-Exam. Publn.) No. S60-17,359 and dried under reduced pressure at 60° C. for 3 hours. The blend was melt-kneaded in a twin-screw vent-type extruder (conditions: number of revolution of screw, 100 rpm; output rate, 3 kg/hr) set at 200° C. The resin temperature at the time was 205° C.

The extruded resin was cut with a cutter, the resulting pellets were dried in a dryer at 80° C. for 3 hours, and then formed into a specimen of 130 mm by 110 mm by 3 mm with a 3 oz. molding machine at a mold temperature of 80° C. and cooling time of 20 sec.

The surface of the specimen was coated with a one-component modified acrylic resin coating material (Plabest ST (No. 20), a trade name, mfd. by NISSIN). The coated specimen was dried at 150° C. for 30 minutes, then brought back to room temperature and subjected to the cross-cut adhesion test. Separately, the thermal decomposition initiation temperature of the resin composition was determined by TGA (thermogravimetric analysis).

The results thus obtained are shown in Tables and 2. The results of similar determinations made in Comparative Examples are shown in Tables 3 and 4.

EXAMPLES 13-18

A polyoxymethylene copolymer containing 2.8% of ethylene oxide was polymerized by a known method described in U.S. Pat. No. 3,027,352. The polymer had an intrinsic viscosity of 1.1 and a melt index of 10.0 g/10 min. The polyoxymethylene copolymer, dried at 80° C. for 3 hours, was blended with a polyester copolymer prepared by the direct method described in Japanese Patent Application Kokoku (Post Exam. Publn.) No. S60-17,359 in the same manner as in Example 1 in the compounding ratios shown in Table 5, and melt-kneaded under the same conditions as described above. The kneaded resin composition was cut with a cutter into pellets, then molded into a plate as described above, and evaluated for its hot-stampability. The stamping foil used for the evaluation was composed of the following layers; that is, from the layer of the side to be contacted with the specimen, in succession, 1) acrylic resin-base sizing agent layer (2 μm thick), 2) metalizing layer (0.1 μm thick, 3) acrylic resin-base top lacquer layer (5 μm thick), 4) silicone wax-base release coating layer (0.05 μm thick), and 5) polyester film (23 μm thick). The stamping foil was inserted between the specimen and a heat resistant silicone rubber sheet of 5 mm thickness and pressed with a small bench press (mfd. by SHINDO METAL INDUSTRY CO.) such that the heat from the press might be transmitted solely from the silicone rubber side, at a gauge pressure of 20 kgf/cm² at 200° C. for 3 seconds. After the pressing, the specimen was brought back to room temperature and the polyester film of the fifth layer mentioned above was peeled off. The metallic tone portion transferred onto the specimen face was subjected to the cross-cut adhesion test. The results are shown in Table 5.

In the same manner, the decorative property of the resin composition of Example 16 was tested with a stamping foil (GLC 700001-02 or BRP71620-02, a trade name, mfd. by Kurz Japan Ltd.) and another stamping foil (mfd. by Takani Sangyo K.K.). The result of the cross-cut adhesion test was zero for every foil.

Separately, the gloss of the molded plates (130 mm by 110 mm by 3 mm) obtained in Examples 17 and 18 and Comparative Examples 2 and 3 before coating or before hot stamping was determined with a surface gloss meter (mfd. by Nippon Denshoku Kogyo K.K.). The specimens of Examples 17 and 18 showed a high degree of delustering as indicated in the following Table.

| Example No. | Gloss (%) |
| --- | --- |
| Example 17 | 25.0 |
| Example 18 | 8.8 |
| Comparative Example 2 | 63.2 |
| Comparative Example 5 | 80.0 |

TABLE 1

| Example No. | Kind and number of mols of diol and dicarboxylic acid (Diol 100 mols, dicarboxylic 100 mols, total 200 mols) | | | | | | Polyester copolymer number average molecular weight | Polyester copolymer (% by weight) |
| --- | --- | --- | --- | --- | --- | --- | --- | --- |
| 1 | Terephthalic acid (75) | Isophthalic acid (20) | Succinic acid (1) | Glutaric acid (1) | Adipic acid (3) | 1,4-Butanediol (100) | 2,000 | 3 |
| 2 | Terephthalic acid (30) | Isophthalic acid (25) | Adipic acid (40) | Glutaric acid (5) | 1,4-Butanediol (50) | Ethylene glycol (50) | 4,800 | 10 |
| 3 | Terephthalic acid (20) | Isophthalic acid (60) | Succinic acid (20) | 1,6-Hexanediol (100) | | | 19,000 | 20 |
| 4 | Terephthalic acid (35) | Isophthalic acid (35) | Succinic acid (30) | Ethylene glycol (10) | Nonanediol (10) | Dodecanediol (80) | 29,000 | 30 |
| 5 | Terephthalic acid (10) | Isophthalic acid (10) | Glutaric acid (80) | Ethylene glycol (100) | | | 50,000 | 50 |
| 6 | Terephthalic acid (10) | Isophthalic acid (10) | Glutaric acid (80) | Ethylene glycol (100) | | | 1,000 | 50 |

| Example No. | Polyoxymethylene resin (% by weight) | Cross-cut test (Number of squares) | Polyester acid value (meq/kg) | Thermal decomposition initiation temp. (°C.) |
| --- | --- | --- | --- | --- |
| 1 | 97 | 2 | 500 | 220 |
| 2 | 90 | 0 | 200 | 220 |
| 3 | 80 | 0 | 52 | 237 |
| 4 | 70 | 0 | 34 | 235 |
| 5 | 50 | 0 | 20 | 240 |
| 6 | 50 | 1 | 110 | 210 |

TABLE 2

| Example No. | Kind and number of mols of diol and dicarboxylic acid (Diol 100 mols, dicarboxylic 100 mols, total 200 mols) | | | | | | Polyester copolymer number average molecular weight | Polyester copolymer (% by weight) | Polyoxymethylene resin (% by weight) | Cross-cut test (Number of squares) |
| --- | --- | --- | --- | --- | --- | --- | --- | --- | --- | --- |
| 7 | Terephthalic acid (10) | Isophthalic acid (10) | Succinic acid (80) | 1,4-Butanediol (100) | | | 60,000 | 40 | 60 | 1 |
| 8 | Terephthalic acid (40) | Isophthalic acid (25) | Adipic acid (30) | Glutaric acid (5) | 1,4-Butanediol (50) | Ethylene glycol (50) | 4,800 | 10 | 90 | 1 |
| 9 | Terephthalic acid (50) | Isophthalic acid (25) | Adipic acid (20) | Glutaric acid (5) | 1,4-Butanediol (50) | Ethylene glycol (50) | 4,800 | 10 | 90 | 2 |
| 10 | Tere- | Iso- | Adipic | Glutaric | 1,4- | Ethylene | 4,800 | 10 | 90 | 2 |

TABLE 2-continued

| Example No. | Kind and number of mols of diol and dicarboxylic acid (Diol 100 mols, dicarboxylic 100 mols, total 200 mols) | | | | | | Polyester copolymer number average molecular weight | Polyester copolymer (% by weight) | Polyoxymethylene resin (% by weight) | Cross-cut test (Number of squares) |
|---|---|---|---|---|---|---|---|---|---|---|
| | phthalic acid (55) | phthalic acid (25) | acid (15) | acid (5) | Butane-diol (50) | glycol (50) | | | | |
| 11 | Terephthalic acid (40) | Isophthalic acid (25) | Pimelic acid (30) | Glutaric acid (5) | 1,4-Butane-diol (50) | Ethylene glycol (50) | 5,000 | 10 | 90 | 1 |
| 12 | Sebacic acid (40) | Azelaic acid (25) | Suberic acid (30) | Glutaric acid (5) | 1,4-Butane-diol (50) | Ethylene glycol (50) | 5,000 | 10 | 90 | 0 |

TABLE 3

| Comparative Example No. | Kind and number of mols of diol and dicarboxylic acid (Diol 100 mols, dicarboxylic 100 mols, total 200 mols) | | | | | | Polyester copolymer number average molecular weight | Polyester copolymer (% by weight) | Polyoxymethylene resin (% by weight) | Cross-cut test (Number of squares) |
|---|---|---|---|---|---|---|---|---|---|---|
| 1 | Terephthalic acid (30) | Isophthalic acid (68) | Adipic acid (1) | Glutaric acid (1) | 1,4-Butane-diol (50) | Ethylene glycol (50) | 4,800 | 10 | 90 | 35 |
| 2 | Sebacic acid (40) | Azelaic acid (57) | Suberic acid (1) | Glutaric acid (2) | 1,4-Butane-diol (50) | Ethylene glycol (50) | 5,000 | 10 | 90 | 25 |
| 3 | — | — | — | — | — | — | — | — | 100 | 100 |
| 4 | Terephthalic acid (45) | Isophthalic acid (52) | Glutaric acid (3) | Ethylene glycol (100) | | | 50,000 | 50 | 50 | 20 |
| 5 | Terephthalic acid (45) | Isophthalic acid (55) | | Ethylene glycol (100) | | | 50,000 | 50 | 50 | 85 |
| 6 | Terephthalic acid (45) | Isophthalic acid (51) | Adipic acid (4) | 1,4-Butane-diol (100) | | | 51,000 | 50 | 50 | 15 |

TABLE 4

| Comparative Example No. | Kind and number of mols of diol and dicarboxylic acid (Diol 100 mols, dicarboxylic 100 mols, total 200 mols) | | | | | | Polyester number average molecular weight | Polyester (% by weight) | Polyoxymethylene resin (% by weight) | Cross-cut test (Number of squares) |
|---|---|---|---|---|---|---|---|---|---|---|
| 7 | Terephthalic acid (75) | Isophthalic acid (5) | Succinic acid (5) | Glutaric acid (10) | Adipic acid (5) | 1,4-Butane-diol (100) | 2,000 | 1 | 99 | 50 |
| 8 | Terephthalic acid (75) | Isophthalic acid (5) | Succinic acid (5) | Glutaric acid (10) | Adipic acid (5) | 1,4-Butane-diol (100) | 2,000 | 60 | 40 | 10 |
| 9 | Terephthalic acid (20) | Isophthalic acid (60) | Succinic acid (20) | Polyethylene glycol (Mn: 800) (100) | | | 19,000 | 20 | 80 | 30 |
| 10 | Terephthalic acid (20) | Isophthalic acid (60) | Succinic acid (20) | Triethylene glycol (100) | | | 19,000 | 20 | 80 | 15 |
| 11* | Terephthalic acid (60) | Isophthalic acid (10) | | | Adipic acid (30) | 1,4-Butane-diol (100) | 40,000 | 15 | 85 | 13 |
| 12 | Terephthalic acid (35) | Isophthalic acid (35) | Succinic acid (30) | Ethylene glycol (10) | | Tridecane-diol-(1,13) | 29,000 | 30 | 70 | 20 |

TABLE 4-continued

| Comparative Example No. | Kind and number of mols of diol and dicarboxylic acid (Diol 100 mols, dicarboxylic 100 mols, total 200 mols) | | | | | | Polyester number average molecular weight | Polyester (% by weight) | Polyoxymethylene resin (% by weight) | Cross-cut test (Number of squares) |
|---|---|---|---|---|---|---|---|---|---|---|
| | | | | | | | (90) | | | |

Note
*Segmentalized copolymer polymerized by using a polybutylene terephthalate (relative viscosity (ηr) 1.45 as determined in o-chlorophenol at concentration of 0.5% at 25° C.; number average molecular weight 3,000) as segment block to give the monomer composition shown above.

TABLE 5

| Example No. | Kind and number of mols of diol and dicarboxylic acid (Diol 100 mols, dicarboxylic 100 mols, total 200 mols) | | | | | | Polyester copolymer number average molecular weight | Polyester copolymer (% by weight) | Polyoxymethylene resin (% by weight) | Cross-cut test (Number of squares) |
|---|---|---|---|---|---|---|---|---|---|---|
| 13 | Terephthalic acid (15) | Isophthalic acid (5) | Succinic acid (30) | Glutaric acid (40) | Adipic acid (10) | 1,4-Butanediol (100) | 5,000 | 40 | 60 | 1 |
| 14 | Terephthalic acid (5) | Isophthalic acid (15) | Succinic acid (30) | Glutaric acid (40) | Adipic acid (10) | 1,4-Butanediol (100) | 5,000 | 40 | 60 | 0 |
| 15 | Terephthalic acid (20) | Isophthalic acid (20) | Succinic acid (30) | Glutaric acid (20) | Adipic acid (10) | 1,4-Butanediol (100) | 15,000 | 20 | 80 | 0 |
| 16 | | | Succinic acid (80) | Glutaric acid (10) | Adipic acid (10) | 1,4-Butanediol (100) | 32,000 | 10 | 90 | 0 |
| 17 | Terephthalic acid (50) | Isophthalic acid (30) | Succinic acid (10) | Glutaric acid (5) | Adipic acid (5) | 1,4-Butanediol (100) | 49,000 | 3 | 97 | 1 |
| 18* | Terephthalic acid (50) | Isophthalic acid (30) | Succinic acid (10) | Glutaric acid (5) | Adipic acid (5) | 1,4-Butanediol (100) | 49,000 | 3 | 94.9 | 0 |

Note
*Contains 2% by weight of trimer of hexamethylene diisocyanate having isocyanurate ring and 0.1% by weight of stearyldimethylamine

What is claimed is:

1. A polyoxymethylene resin composition comprising 50–97% by weight of a polyoxymethylene resin and 3–50% by weight of a polyester random copolymer comprising a diol residue A and a dicarboxylic acid residue B, said diol residue A being represented by the formula $+O-R-O+$, wherein R is an alkyl group of 2–12 carbon atoms, and said dicarboxylic acid residue B being represented by at least one of formulae (1), (2) and (3),

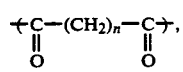 (1)

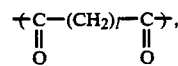 (2)

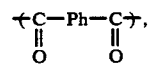 (3)

wherein n is an integer of 2–6, l is an integer of 7–24, and Ph is an aromatic hydrocarbon residue, the proportion of (1) to the sum of (1), (2) and (3) being 20–100% by mol, provided that when said proportion is 100% by mol, (1) consist of at least two different types of (1).

2. The polyoxymethylene resin composition according to claim 1, wherein the polyester random copolymer has an acid value of 100 meq/kg or less.

3. The polyoxymethylene resin composition according to claim 1, which further comprises 0.3–2% by weight of an antioxidant.

4. The polyoxymethylene resin composition according to claim 1, wherein said polyoxymethylene resin is an oxymethylene homopolymer or an oxymethylene copolymer comprising 0.1–20% by weight of oxyalkylene units of 2–8 carbon atoms.

5. The polyoxymethylene resin composition according to claim 1, wherein said polyoxymethylene resin is an oxymethylene copolymer having a branched molecular chain.

6. The polyoxymethylene resin composition according to claim 1, wherein the polyester random copolymer has a melting point of 80°–180° C.

7. The polyoxymethylene resin composition according to claim 1, wherein the polyester random copolymer has a melting point of 90°–160° C.

8. The polyoxymethylene resin composition according to claim 1, wherein the polyester random copolymer has a number average molecular weight of 2,000–50,000.

9. The polyoxymethylene resin composition according to claim 1, wherein the polyester random copolymer has a number average molecular weight of 5,000–30,000.

10. The polyoxymethylene resin composition according to claim 1, which further comprises an isocyanate compound coupling agent and a tertiary amine catalyst.

* * * * *